Aug. 20, 1957
G. L. KITSON
2,803,334
FEEDING SYSTEM
Filed Dec. 22, 1953
2 Sheets-Sheet 1
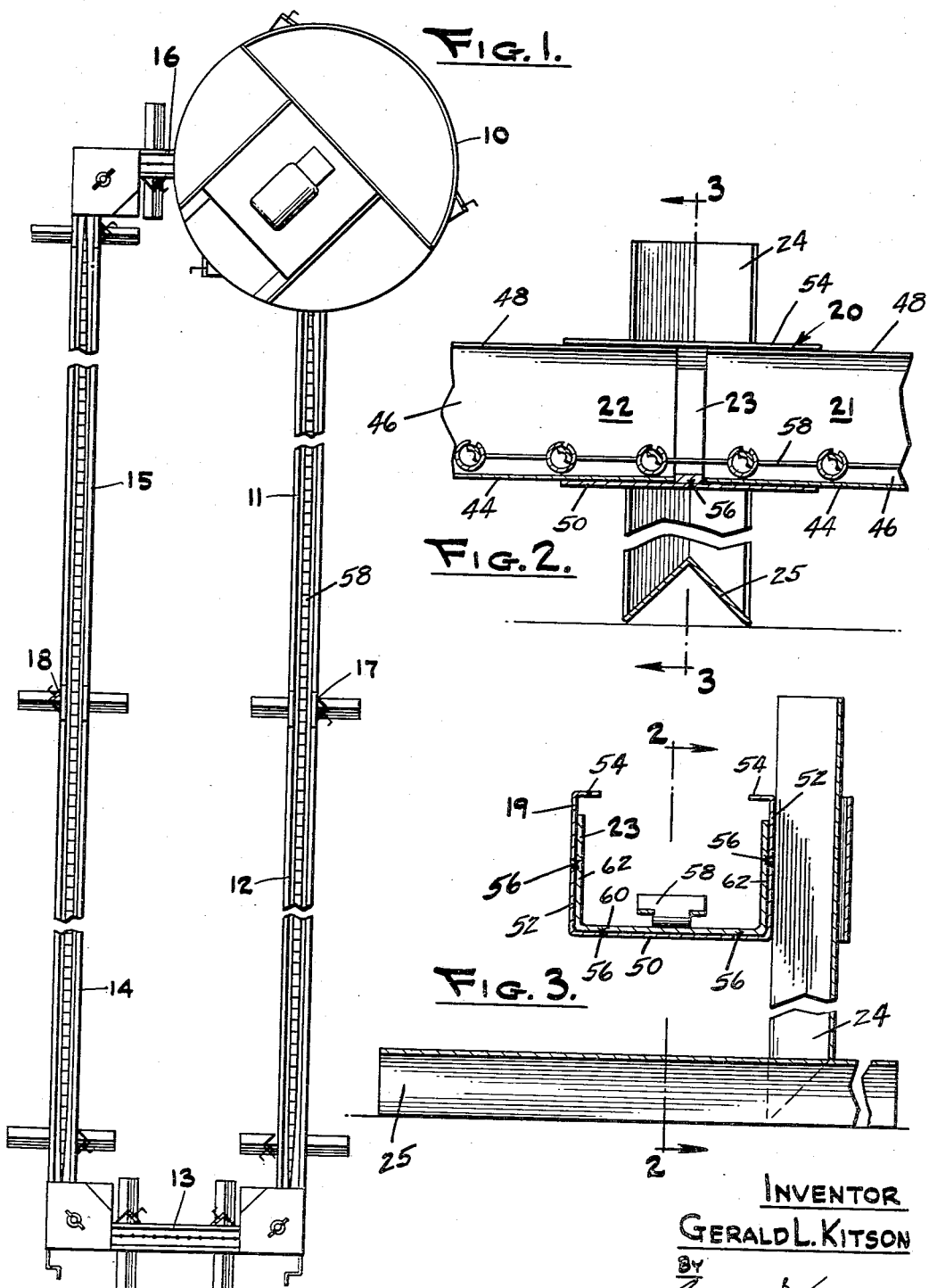
INVENTOR
GERALD L. KITSON
BY
ATTORNEY

INVENTOR
GERALD L. KITSON
BY
ATTORNEY

United States Patent Office 2,803,334
Patented Aug. 20, 1957

2,803,334

FEEDING SYSTEM

Gerald L. Kitson, Rockford, Mich.

Application December 22, 1953, Serial No. 399,680

8 Claims. (Cl. 198—204)

This invention relates to a feeding system eminently suited for use in connection with automatic stock feeders of the type shown and described in the application of Gerald L. and Charles H. Kitson, Serial No. 768,554, filed on August 14, 1947, and now Patent No. 2,589,706, and in the application of Gerald L. Kitson, Serial No. 130,152, filed on November 30, 1949, and now abandoned, of which this is a continuation-in-part.

In these machines, a feed-supply hopper is operated in conjunction with a suitable number of sections or lengths of open-top troughs or channels forming a conduit. An endless flexible distributing member is positioned in the conduit and is moved axially over the bottom of the trough causing feed from the hopper to be uniformly distributed throughout the length of the trough so that a maximum number of animals may be fed. The sections of trough forming the feed conduit are preferably made of relatively thin sheet metal, and such sections are usually manufactured in lengths of approximately ten feet or less. Since the total length of a trough system of such a machine may run to several hundred feet it follows that a large number of junction points occur where the trough sections come together.

The endless flexible distributing member is usually in the form of a flat link chain which introduces a very troublesome wear problem at the points where this chain drags across the junctions between the sheet metal trough sections. Since there will always be more or less misalignment between the meeting sections of trough, the projecting edges caused by such misalignment are subjected to abrasion and sometimes shear by the moving chain. Since the composition of the trough sections and of the chain is generally similar, the wear at these points is such as to require special consideration in order to assure that these portions of the machine do not break down at an early stage in its operation. As the wear of the sheet metal at the junction points progressively decreases the thickness of the material, the point is finally reached where a form of tearing action begins, resulting in the presentation of jagged surfaces to the passage of the chain, and considerably increasing resistance to its movement.

The present invention provides deflecting surfaces or members associated with the junction points of the trough sections whose purpose is to elevate the moving distributing member and hold it away from the meeting ends of the sheet metal trough sections. These deflecting surfaces are provided to protect the bottom and preferably both sides of the trough sections at their joints.

It is preferable to form the deflecting surfaces of a particularly wear-resistant material as compared with that constituting the trough sections, such as hardened steel. It is also preferable to provide an adjustable supporting unit for the trough sections at their junction points in order to assure adequate alignment of adjacent trough sections so as to minimize the amount of discontinuity. The deflecting surface must be nearer to the center of the cross section of the conduit than are the immediately adjacent meeting ends of the trough sections. It then becomes impossible for the moving distributing member to actually make contact with the sharp ends of the sheet metal.

The various features of the present invention will be discussed in detail by an analysis of the particular embodiments illustrated in the accompanying drawings wherein:

Fig. 1 is a plan view of a stock feeder embodying the invention;

Fig. 2 is a fragmentary longitudinal section taken along line 2—2 of Fig. 3;

Fig. 3 is a transverse section taken along line 3—3 of Fig. 2; and

Figure 4:
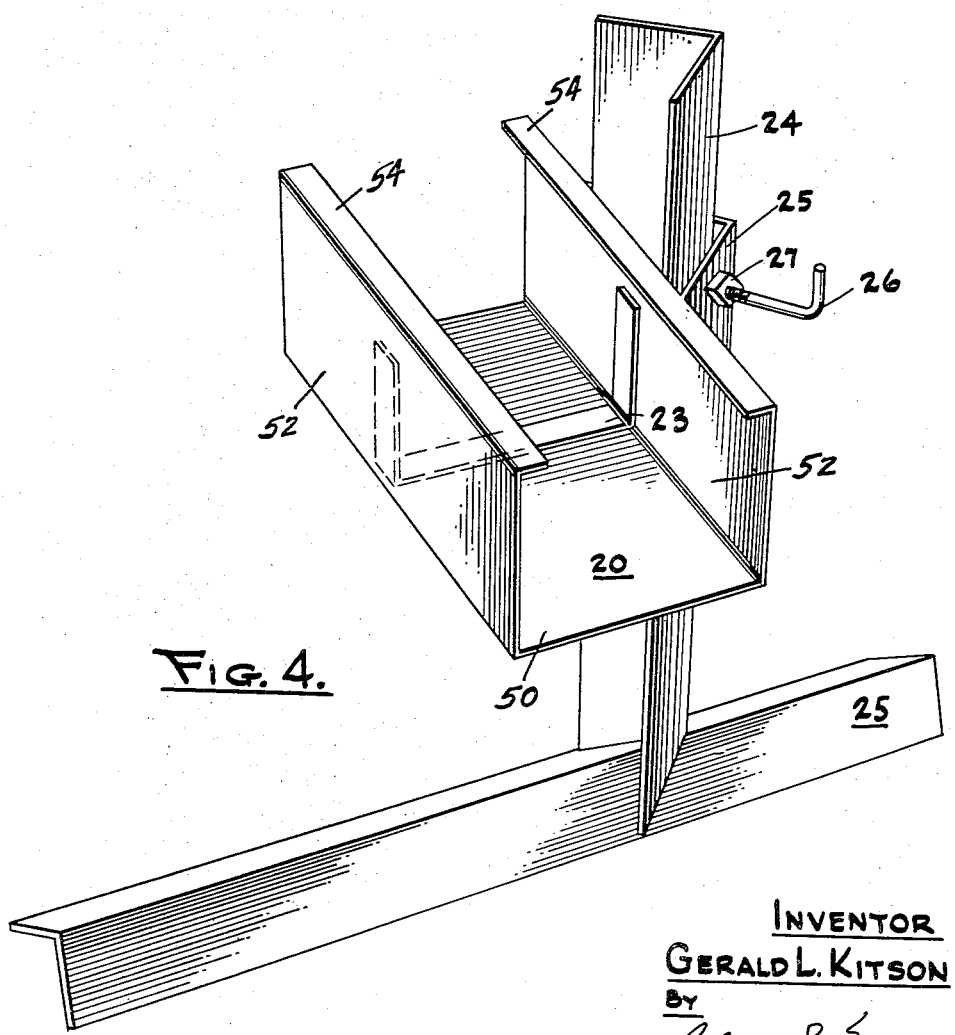
Fig. 4 is a perspective view on an enlarged scale of a junction member.

Referring to Fig. 1, there is shown a feed hopper 10 arranged to supply feed to a trough system composed of the trough or channel sections 11, 12, 13, 14, 15, 16, interconnected by junction and corner members shown. The trough sections are channels in cross section, having bottom walls 44, side walls 46 and inwardly directed flanges 48 at the upper ends of the side walls, substantially parallel to the bottom walls. The construction of the corner members is set forth in detail in the application of Gerald L. Kitson and Blaine K. Stevens, Serial No. 130,151, filed on November 30, 1949, and now Patent No. 2,712,379, while the present invention is principally concerned with the junction members.

Referring to Figs. 1, 2, 3, and 4, junction members 17, 18 and 19 are each shown as providing an aligning sleeve 20 of such a size as to axially receive the ends of the conduit sections 21 and 22. The junction members are channels in cross section having bottom walls 50, side walls 52, and opposed flanges 54 at the upper ends of the side walls projecting inwardly in parallelism to the bottom walls. Each junction member carries a deflecting surface 23 of material preferably harder than the conduit sections to be interposed between the ends of sections 21 and 22. As indicated in Figs. 2 and 3, welded joints 56 may appropriately secure these deflecting members in place. It is preferable that the deflecting surface project inwardly with respect to the trough sections with which it is associated so that the driven distributing member 58 is directed away from the ends of the sheet metal trough sections. It is possible under some circumstances to use a relatively hard deflecting member of approximately the same thickness as that of the troughs, and provide a substantially continuous surface between one section and the other across the deflecting surface.

The fact that the material of the deflecting surface is relatively wear resistant will materially reduce the abrasive and destructive effect of the moving chain or other distributing member 58 even though there is no differential height between the deflecting surface and the ends of adjacent trough sections. The deflecting member is depicted as having a bottom 60 and two sides 62 perpendicular thereto, assuming a cross section of U-shape which will protect the bottom and side walls of the trough sections. The extent of these deflecting members can be varied to avoid undue wear over as much of the periphery of the trough sections as may be required.

It is also preferable to combine an adjustable supporting leg structure with each junction device including a vertical leg member 24, and a horizontal base member 25 suitably securely fastened to the lower end of the vertical leg member as by welding. The cross section of the vertical leg member 24 is approximately that of a right angle having sides of substantially equal length.

A sleeve member 25 of similar shape but having slightly wider flanges is welded to one of the side walls 52 of each aligning sleeve 20, and slidably receives the vertical leg member 24. To establish and maintain a desired vertical position of the trough assembly on the leg 24, a set screw 26 is provided for cooperation with a threaded collar 27 securely attached, as by welding, to the sleeve member 25. In this manner the height of the trough sections can be readily adjusted, and the alignment of the various sections maintained so as to provide the minimum resistance to the passage of the endless flexible distributing member 58.

The particular embodiments which have been illustrated in the accompanying drawing and discussed herein are not to be considered as limitations upon the scope of the appended claims. If these claims it is the intent of the inventor to claim the entire invention to which he is entitled in view of the prior art.

I claim:

1. A feeding system comprising trough shaped conduit sections formed of sheet material and arranged in substantially aligned spaced relationship, a sleeve receiving the ends of said conduit sections, a deflecting member interposed between the ends of said sections and attached to the inner surface of said sleeve transversely to the axis thereof, supporting structure for said conduit sections and said sleeve, said supporting structure being secured to said sleeve, and a distributing member slidably engaging said deflecting member and conduit sections.

2. A feeding system as set forth in claim 1 wherein said deflecting member is wholly contained within said sleeve.

3. A feeding system as set forth in claim 1 wherein said conduit sections are of channel shape.

4. A feeding system as set forth in claim 1 wherein said conduit sections and sleeve have upper edges terminating in opposed inwardly directed flanges.

5. A feeding system as set forth in claim 1 wherein an adjustable support sustains said sleeve.

6. A feeding system as set forth in claim 1 wherein said distributing member is endless.

7. A feeding system as set forth in claim 1 wherein said distributing member is a chain.

8. A feeding system as set forth in claim 1 wherein said sleeve is of channel shape in section and has longitudinal edges extending towards one another to confine said sections.

References Cited in the file of this patent

UNITED STATES PATENTS

| | | |
|---|---|---|
| 1,123,882 | Jensen | Jan. 5, 1915 |
| 2,149,158 | Bergmann | Feb. 28, 1939 |
| 2,360,159 | Peck | Oct. 10, 1944 |
| 2,367,256 | Atkins | Jan. 16, 1945 |
| 2,536,950 | Long | Jan. 2, 1951 |

FOREIGN PATENTS

| | | |
|---|---|---|
| 549,707 | Germany | Apr. 30, 1932 |